Dec. 22, 1953     P. J. MILLER     2,663,392
PORTABLE SINK FOR CAMPERS' USE

Filed June 26, 1952     2 Sheets-Sheet 1

INVENTOR.
Paul J. Miller,
BY George D. Richards
Attorney

Dec. 22, 1953     P. J. MILLER     2,663,392
PORTABLE SINK FOR CAMPERS' USE
Filed June 26, 1952     2 Sheets-Sheet 2
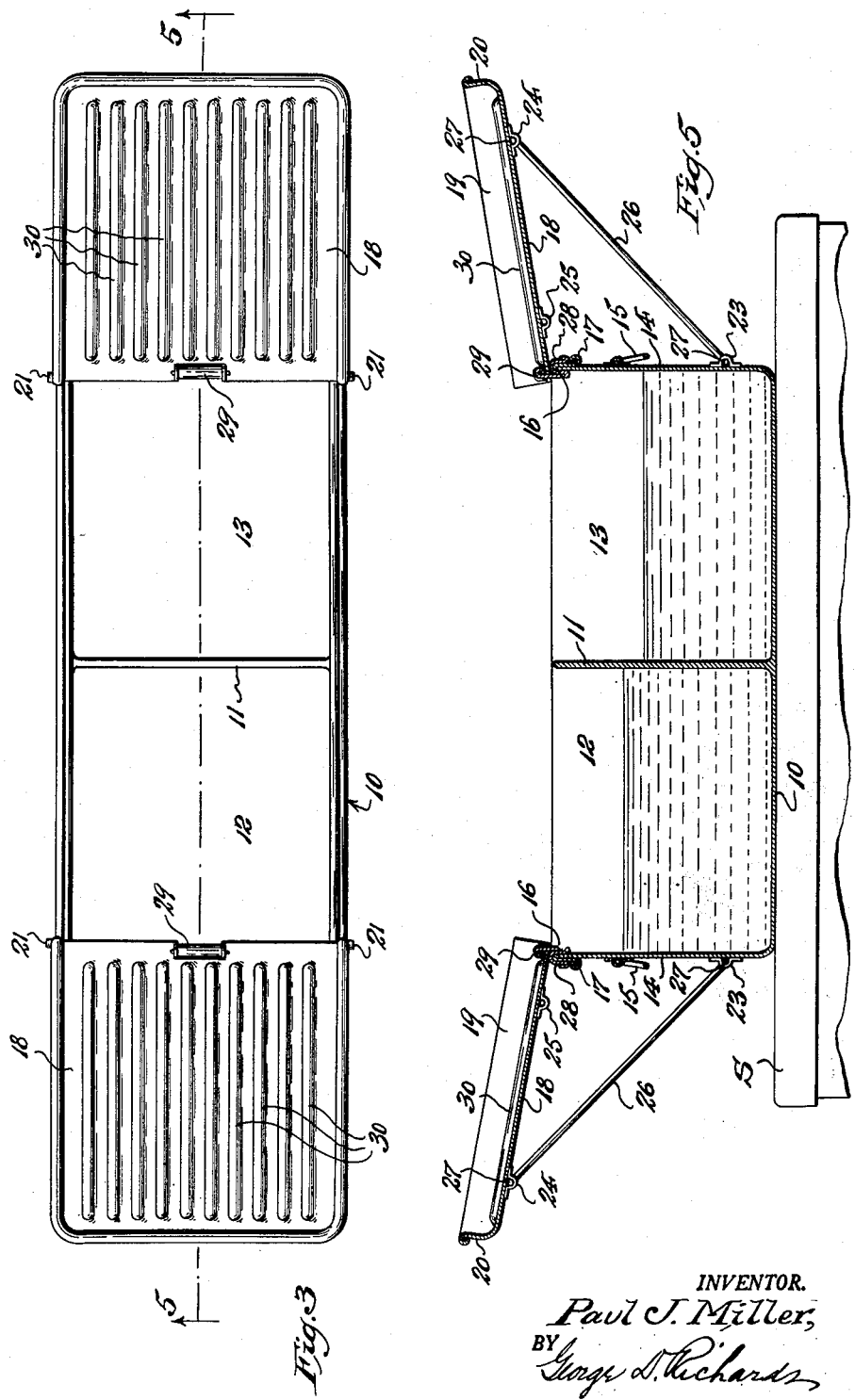
INVENTOR.
Paul J. Miller,
BY George D. Richards
Attorney

UNITED STATES PATENT OFFICE 2,663,392

PORTABLE SINK FOR CAMPERS' USE

Paul J. Miller, Butte, Mont.

Application June 26, 1952, Serial No. 295,788

5 Claims. (Cl. 190—12)

This invention relates to camping equipment, and has reference, more particularly, to a portable sink for campers' use.

In outdoor camping, the constantly recurring task of cleaning up after preparation and consumption of meals is one in connection with which campers most miss the conveniences of the home kitchen. Water, of course, can be heated in a kettle or dish pan, and dishes, tableware and cooking utensils washed therein, but lack of facilities for rinsing and thereafter supporting the cleansed articles, ready to be dried, without risk of contact thereof with dirt, adds greatly to labor and inconvenience of handling the articles out of doors, and unduly prolongs the operation of cleaning up.

Having the above stated circumstances in view, it is an object of this invention to provide a novel construction of portable receptacle which is especially adapted for service as a camp sink in which to cleanse dishes, tableware and cooking utensils; said receptacle being provided with a novel construction and arrangement of cover sections which, when removed from normal closing relation to the receptacle body, can be respectively coupled with the opposite ends of said receptacle body, and so supported in inclined relation thereto as to serve as drain boards for support of articles undergoing cleansing operations.

The invention has for another object to provide a camp sink structure, characterized as above stated, which can be stood upon a gasoline or other type of camp stove, so that water, for both washing and rinsing, can be directly heated therein ready for use in dish, tableware and cooking utensil cleansing operations.

Another object of this invention is to provide a camp sink structure, characterized as above stated, the interior of which, when closed by its cover sections, can serve as a storage chest in which dishes, tableware and other utensils can be packed for carriage.

The above and other objects of this invention will be understood from a reading of the following description thereof in connection with the accompanying drawings, in which:

Fig. 3 is a plan view of said camp sink forming receptacle as opened out for use as a sink, with its cover sections coupled to and supported at the ends of the receptacle body to provide drainboard supports for articles undergoing cleansing operations; Fig. 5 is a longitudinal sectional view of the same, taken on line 5—5 in Fig. 3.

Similar characters of reference are employed in the above described views, to indicate corresponding parts.

Figure 1:
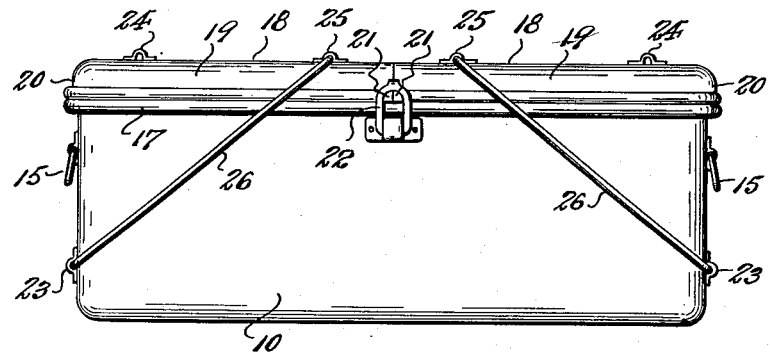
Fig. 1 is an elevational view of the camp sink forming receptacle of this invention, as closed for use as a storage and carrying chest.

Referring to the drawings, the reference character 10 indicates the upwardly open body of a sink forming receptacle of rectangular shape. Said sink body is made of metal, preferably of aluminum, and can be fabricated from sheet, cast or stamped metal, as may be desired. The interior of the sink body 10 is transversely subdivided intermediate its ends by a partition 11, whereby to provide a wash water basin 12 on one side of this partition and a rinse water basin 13 on the other side thereof. Exteriorly mounted on the respective end walls 14 of the sink body 10 are suitable handle members 15 to facilitate handling thereof. The upwardly open top of the sink body 10 is surrounded by an upstanding rim portion 16, preferably having a reenforcing stop bead 17 spaced downwardly from its top free edge.

Cover means is provided for closing the sink body 10, and is so characterized as to be convertible for use as sink serving drain board means, when the body is opened for use as a sink. Said cover means comprises a pair of separable sections, each being formed by a top wall 18, side walls 19 and an outer end wall 20, thus leaving their inner ends open. When disposed in sink body closing relation, these cover sections are arranged end to end, with their inner open ends opposed and closed together, and are then engaged over the rim portion 16 of the sink body. The abutted open end portions of said cover sections are respectively provided with matching catch nosings 21 disposed to project externally from opposite sides thereof. Exteriorly mounted on the side walls of the sink body 10 are manipulatable catch devices 22 which are adapted to be engaged with and embrace meeting catch nosings 21 of the cover sections, whereby to releasably retain the cover sections in closed relation to the sink body 10 (see Fig. 1).

Affixed to the exterior face of each end wall 14 of the sink body 10, near the bottom thereof and respectively adjacent to each side thereof, are socket or loop members 23. Affixed to the exterior face of the top wall 18 of each cover section, near the outer end thereof and respectively adjacent to each side thereof, are outer socket or loop members 24, and, similarly, near the inner end thereof, and also respectively adjacent to each side thereof, are affixed inner socket or loop members 25. Connectible by selected socket or loop members to and between respective ends of the sink body 10 and the respective cover sections are stay bars 26, which are each provided at their opposite ends with angularly projecting coupler arms 27 adapted to be detachably engaged with said selected socket or loop members.

Figures 2, 4:
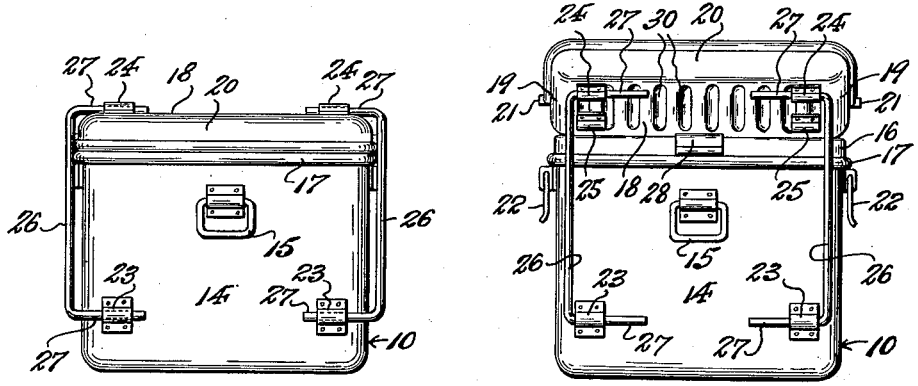
Fig. 2 is an end elevational view of the same.
Fig. 4 is an end elevational view of the same.

When the cover sections are disposed in closed relation to the sink body 10, stay bars 26 are engaged between socket or loop members 23 on the sink body ends and inner socket or loop members 25 of the cover sections, by inserting the coupler arms 27 of said stay bars through said socket or loop members 23 and 25, whereby said stay bars respectively embrace the sides of the sink body and cover sections in attached assembled relation thereto, and are thus retained against loss, while at the same time assisting to secure the cover sections in their closed relation to the sink body (see Figs. 1 and 2).

When it is desired to condition the sink body for use as a sink, the stay bars 26 are removed from the closed sink body and cover section assembly, and the cover sections are thereupon released and removed from their closing relation to the open top of the sink body. The cover sections, having been removed, are thereupon inverted, and their inner open ends respectively aligned with the respective ends of the sink body 10, so as to overhang the end walls 14 of the latter. Each cover section is provided, at its inner open end, with means to detachably couple said end to the rim of a sink body end wall 14. An illustrative form of coupling means for this purpose comprises a bifurcate coupling clip 28 adapted to engage over and in straddling relation to a sink body end wall 14. Preferably, said coupling clip 28 is pivotally connected by a hinge connection 29 with the inner end of the cover section to be served thereby, so that it may depend exteriorly from said cover section end when the cover section is inverted, or interiorly therefrom when said cover section is disposed in closing relation to the open top of the sink body.

To hold the cover sections, as thus coupled to the respective ends of the sink body 10, to extend therefrom in downwardly and inwardly inclined disposition for article support and drain board service, stay bars 26 are engaged between outer socket or loop members 24 of the cover sections and the socket or loop members 23 on the sink body ends, by inserting the coupler arms 27 of said stay bars through said socket or loop members 23 and 24, whereby to support and prop said cover sections in such drain board service positions (see Figs. 3, 4 and 5). To better adapt said cover sections for such drain board service, it is preferable to form the top walls 18 thereof with laterally spaced, longitudinal corrugations or ribs 30.

When the receptacle is converted to its sink serving condition as above described, the basins 12 and 13 can be supplied with a water content, and the sink body 10 then deposited upon a gasoline or other camp stove S (see Fig. 5), whereby to heat the water for article washing or rinsing use. It will be obvious that articles to be cleansed can be stood upon the left hand drain board adjacent the wash water basin 12, so as to be conveniently removed therefrom and washed in said wash water basin; thereafter being rinsed in the rinse water basin 13, and then deposited upon the right hand drain board ready for drying.

Not only is this arrangement such as to expedite the article cleansing operations, but the cleansed and rinsed articles can be conveniently supported and drained without risk of contact with dirt, or accidental soiling when clean.

When traveling or moving from place to place, the novel sink forming receptacle serves admirably as a chest for storage and carriage of dishes, tableware and cooking utensils, since such articles can be compactly and safely packed within the empty basins 12 and 13 of the sink body 10, whereupon the cover sections can be disposed and secured in sink body closing relation, thus enclosing the articles so that the same are well protected against dirt or other contamination, and consequently remain in clean and sanitary condition ready for use.

From the above it will be understood that a very convenient and useful addition to outdoor camping equipment is provided by this invention.

It will be understood that various changes could be made in the above described portable sink structure for campers' use without departing from the scope of this invention as defined in the herefollowing claims. It is, therefore intended that the matter contained in the above description and shown in the accompanying drawings shall be interpreted as illustrative and not in a limiting sense.

I claim:

1. A portable sink for campers' use comprising an upwardly open sink body subdivided between its ends to provide a wash water basin and a rinse water basin, separable cover sections each open at one end and adapted to be aligned in end to end relation with their open ends abutted to thereby form a closure for the open top of the sink body, said cover sections being removable from closed relation to the sink body for disposition in inverted condition to respectively extend outwardly from opposite ends of the sink body, in drain board forming relation to said sink body, with their open ends respectively overhanging the respective end walls of said sink body, coupling means carried by the open ends of said cover sections operative to detachably engage the top marginal portions of the end walls of said sink body whereby to connect said cover sections in said extension therefrom, a pair of stay bars for each cover section, each stay bar having coupler arms projecting angularly from its opposite ends, a pair of socket devices affixed to the external face of each sink body end wall, and a pair of socket devices affixed to the external face of each cover section adjacent its outer end, coupler arms at opposite ends of said stay bars being adapted to be respectively detachably engaged with said first and second named pairs of socket devices, whereby to connect said stay bars between said sink body and the cover sections in one position, when the sink body is open, to support the cover sections in inwardly and downwardly inclined drain board forming relation to the open sink body.

2. A portable sink for campers' use according to claim 1, wherein the cover sections are each provided with catch nosings externally projecting from the sides of their meeting open end portions, and manipulatable catch devices mounted on the sink body sides to mutually engage said catch nosings, whereby to releasably secure said cover sections in their aligned end to end closed relation to the sink body.

3. A portable sink for campers' use according to claim 1, including a third pair of socket devices affixed to the external face of each cover section adjacent its inner open end, opposite ends of said stay bars being adapted to be respectively detachably engaged by their respective coupling arms with said socket devices on the sink body and said third pair of socket devices on the cover sections, whereby to connect said stay bars, in another position, between and in side embracing relation to the sink body and the cover sections when the former is closed by the latter.

4. A portable sink for campers' use according to claim 3, wherein the cover sections are each provided with catch nosings externally projecting from the sides of their meeting open end portions, and manipulatable catch devices mounted on the sink body sides to mutually engage said catch nosings, whereby to releasably secure said cover sections in their aligned end to end closed relation to the sink body.

5. A portable sink for campers' use comprising an upwardly open sink body, separable cover sections each open at one end and adapted to be aligned in end to end relation with their open ends abutted to thereby form a closure for the open top of the sink body, said cover sections being removable from closed relation to the sink body for disposition in inverted condition to respectively extend outwardly from opposite ends of the latter in drain board forming relation thereto, with the open ends of said cover sections respectively overhanging the respective end walls of the sink body, coupling means carried by the open ends of said cover sections operative to detachably engage the top marginal portions of said end walls of the sink body whereby to connect the cover sections in extension therefrom, a pair of stay bars for each cover section, each stay bar having coupler arms projecting angularly from its opposite ends, a pair of socket devices affixed to the external face of each sink body end wall, another pair of socket devices affixed to the external face of each cover section adjacent its outer end, coupler arms at opposite ends of said stay bars being adapted to be respectively detachably engaged with said first and second named pair of socket devices, whereby to connect said stay bars between said sink body and cover sections in one position, when the sink body is open, to support the cover sections in inwardly and downwardly inclined drain board forming relation to the open sink body, and a third pair of socket devices affixed to the external face of each cover section adjacent its inner open end, opposite ends of said stay bars being adapted to be respectively detachably engaged by their respective coupling arms with said socket devices on the sink body and said third pair of socket devices on the cover sections, whereby to connect said stay bars, in another position, between and in side embracing relation to the sink body and cover sections when the former is closed by the latter.

PAUL J. MILLER.

References Cited in the file of this patent
UNITED STATES PATENTS

| Number | Name | Date |
|---|---|---|
| 176,304 | Harper, Sr. | Apr. 18, 1876 |
| 1,445,566 | Stoll | Feb. 13, 1923 |
| 1,478,244 | Musso | Dec. 18, 1923 |
| 2,173,610 | Haven | Sept. 19, 1939 |
| 2,594,938 | Leavitt | Apr. 29, 1952 |

FOREIGN PATENTS

| Number | Country | Date |
|---|---|---|
| 143,983 | Austria | Dec. 10, 1935 |
| 546,208 | Great Britain | July 2, 1942 |